US008934786B2

(12) United States Patent
Liu et al.

(10) Patent No.: US 8,934,786 B2
(45) Date of Patent: Jan. 13, 2015

(54) COMMUNICATION THROUGH PRE-DISPERSION-COMPENSATED PHASE-CONJUGATED OPTICAL VARIANTS

(75) Inventors: Xiang Liu, Marlboro, NJ (US); Peter J. Winzer, Aberdeen, NJ (US); Andrew Roman Chraplyvy, Matawan, NJ (US); Robert William Tkach, Little Silver, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 303 days.

(21) Appl. No.: 13/601,236

(22) Filed: Aug. 31, 2012

(65) Prior Publication Data
US 2013/0071119 A1 Mar. 21, 2013

Related U.S. Application Data

(63) Continuation-in-part of application No. 13/411,462, filed on Mar. 2, 2012, which is a continuation-in-part of application No. 13/245,160, filed on Sep. 26, 2011, now Pat. No. 8,824,501.

(60) Provisional application No. 61/535,548, filed on Sep. 16, 2011.

(51) Int. Cl.
*H04B 10/04* (2006.01)
*H04B 10/516* (2013.01)
*H04B 10/2513* (2013.01)

(52) U.S. Cl.
CPC ........ *H04B 10/516* (2013.01); *H04B 10/25137* (2013.01)
USPC ............................ 398/193; 398/147; 398/159

(58) Field of Classification Search
CPC .................... H04B 10/2507; H04B 10/25073; H04B 10/2513; H04B 10/25137; H04B 10/2531; H04B 10/2569; H04B 10/58
USPC ........... 398/147, 150, 159, 81, 192, 193, 182, 398/183
See application file for complete search history.

(56) References Cited

U.S. PATENT DOCUMENTS 6,263,465 B1 7/2001 Gehlot
6,683,855 B1 1/2004 Bordogna et al.
(Continued)

FOREIGN PATENT DOCUMENTS

EP 1191726 A1 3/2002
EP 1341322 A2 9/2003
WO 2010107439 A1 9/2010

OTHER PUBLICATIONS

Pan Z et al: "Intrabit Polarization Diversity Modulation for the Mitigation of PMD Effects" IEEE Photonics Technology Letters, IEEE Service Center, Piscataway, NJ. US, vol. 14 No. 10, Oct. 1, 2002, pp. 1466-1468, XP011432458.
(Continued)

*Primary Examiner* — M. R. Sedighian
(74) *Attorney, Agent, or Firm* — A. Ralston; D. M. LaBrune

(57) ABSTRACT

An apparatus comprises an optical transmitter that comprises a processor and at least one optical modulator. The processor is configured to generate electronic representations of at least two pre-dispersion-compensated phase-conjugated optical variants carrying a same modulated payload data for transmission. The at least one optical modulator is configured to modulate the electronic representations, wherein an amount of dispersion induced on the pre-dispersion-compensated phase-conjugated optical variants depends on an accumulated dispersion (AD) of a transmission link through which the pre-dispersion-compensated phase-conjugated optical variants are to be transmitted. The amount of dispersion induced on the phase-conjugated optical variants may be approximately −AD/2, where AD is the accumulated dispersion of the transmission link. The pre-dispersion-compensated phase-conjugated optical variants are different from one another in one or more dimensions such as the polarization of light, the time of transmission, the spatial localization, the optical carrier wavelength, or the subcarrier frequency during transmission.

31 Claims, 7 Drawing Sheets

200

| Obtain the payload signal sequence, E(t) | | ← 201 |
|---|---|---|
| Let $E_x(t)=E(t)$ | Let $E_y(t)=E(t-\tau)^*$ | ← 202 |
| Add training symbols and pilots | Add training symbols and pilots | ← 203 |
| Perform pre-dispersion-compensation: $E_{x,Pre}(t)=H_{Pre}(t) \otimes E_x(t)$ | Perform pre-dispersion-compensation: $E_{y,Pre}(t)=H_{Pre}(t) \otimes E_y(t)$ | ← 204 |
| Output to two DACs: $I_{x,Pre}(t)=real[E_{x,Pre}(t)]$, $Q_{x,Pre}(t)=imag[E_{x,Pre}(t)]$, | Output to two DACs: $I_{y,Pre}(t)=real[E_{y,Pre}(t)]$, $Q_{y,Pre}(t)=imag[E_{y,Pre}(t)]$, | ← 205 |

(56) References Cited

U.S. PATENT DOCUMENTS

| | | | |
|---|---|---|---|
| 7,212,741 | B2 | 5/2007 | Myong et al. |
| 7,424,651 | B2 | 9/2008 | Domagala et al. |
| 7,574,146 | B2 | 8/2009 | Chiang et al. |
| 7,688,918 | B2 | 3/2010 | Koc |
| 7,734,191 | B1 | 6/2010 | Welch et al. |
| 7,756,421 | B2 * | 7/2010 | Roberts et al. ............... 398/158 |
| 8,112,001 | B2 * | 2/2012 | Lowery et al. ............... 398/158 |
| 2008/0075472 | A1 | 3/2008 | Liu et al. |
| 2008/0152361 | A1 | 6/2008 | Chen et al. |
| 2008/0279564 | A1 | 11/2008 | Han et al. |
| 2009/0169213 | A1 * | 7/2009 | Lowery et al. ................ 398/98 |
| 2009/0238580 | A1 * | 9/2009 | Kikuchi ....................... 398/192 |
| 2010/0158521 | A1 | 6/2010 | Doerr et al. |
| 2010/0329670 | A1 | 12/2010 | Essiambre et al. |
| 2010/0329671 | A1 | 12/2010 | Essiambre et al. |
| 2011/0038631 | A1 | 2/2011 | Doerr |
| 2012/0201546 | A1 * | 8/2012 | Mizuochi et al. ............ 398/147 |

OTHER PUBLICATIONS

International Search Report—PCT/US2012/054755—Filing Date: Sep. 12, 2012, Mailing Date: Nov. 23, 2012—4 pages.

Eado Meron et al: "Use of Space Time Coding in Coherent Polarization-Multiplexed Systems Suffering From Polarization-Dependent Loss", Optics Letters, OSA, Optical Society of America, Washington, DC, US, vol. 35, No. 21, Nov. 2, 2010, pp. 3547-3549, XP001558183.

Gupta S et al: "Dispersion Penalty Mitigation Using Polarization Mode Multiplexing in Phase Diverse Analog Optical Links". Optical Fiber Communication/National Fiber Optic Engineers Conference, 2008, OFC/NFOEC 2008, Conference on, IEEE, Piscataway, NJ, USA, Feb. 24, 2008, pp. 1-3, XP031391214.

International Search Report—PCT/US2012/054813—Filing Date: Sep. 12, 2012, Mailing Date: Nov. 23, 2012—4 pages.

Chongjin Xie et al: "Electronic Nonlinearity Compensation in 112-Gb/s PDM-QPSK Optical Coherent Transmission Systems", 36th European Conference and Exhibition on Optical Communication ; (ECOC 2010); Torino, Italy, Sep. 19-23, 2010, IEEE, Piscataway, NJ, USA, Sep. 19, 2010, pp. 103, XP031789766.

International Search Report—PCT/US2012/055012—Filing Date: Sep. 13, 2012, Mailing Date: Dec. 5, 2012—4 pages.

* cited by examiner

200

| Obtain the payload signal sequence, E(t) || ~201 |
|---|---|---|
| Let $E_x(t)=E(t)$ | Let $E_y(t)=E(t - \tau)^*$ | ~202 |
| Add training symbols and pilots | Add training symbols and pilots | ~203 |
| Perform pre-dispersion-compensation:<br>$E_{x, Pre}(t)=H_{Pre}(t) \otimes E_x(t)$ | Perform pre-dispersion-compensation:<br>$E_{y, Pre}(t)=H_{Pre}(t) \otimes E_y(t)$ | ~204 |
| Output to two DACs:<br>$I_{x, Pre}(t)=real[E_{x, Pre}(t)]$,<br>$Q_{x, Pre}(t)=imag[E_{x, Pre}(t)]$, | Output to two DACs:<br>$I_{y, Pre}(t)=real[E_{y, Pre}(t)]$,<br>$Q_{y, Pre}(t)=imag[E_{y, Pre}(t)]$, | ~205 |

*FIG. 2*

| | | |
|---|---|---|
| Obtain the payload signal sequence, E(t) ⟵ 601 | | |
| De-interleave E(t) into two equal-length sequences, $E_{even}(t)$ and $E_{odd}(t)$ ⟵ 602 | | |
| Let $E_{1x}(t)=E_{even}(t)$ ⟵ 603 | Let $E_{1y}(t)=E_{odd}(t)$ | Let $E_{2x}(t)=E_{even}(t)^*$ | Let $E_{2y}(t)=E_{odd}(t)^*$ |
| Add training symbols and pilots ⟵ 604 | Add training symbols and pilots | Add training symbols and pilots | Add training symbols and pilots |
| Perform pre-dispersion-compensation: $E_{1x,Pre}(t)=H_{Pre}(t) \otimes E_{1x}(t)$ ⟵ 605 | Perform pre-dispersion-compensation: $E_{y,Pre}(t)=H_{Pre}(t) \otimes E_{1y}(t)$ | Perform pre-dispersion-compensation: $E_{2x,Pre}(t)=H_{Pre}(t) \otimes E_{2x}(t)$ | Perform pre-dispersion-compensation: $E_{2y,Pre}(t)=H_{Pre}(t) \otimes E_{2y}(t)$ |
| Output to two DACs: $I_{1x,Pre}(t)=real[E_{1x,Pre}(t)]$, $Q_{1x,Pre}(t)=imag[E_{1x,Pre}(t)]$ ⟵ 606 | Output to two DACs: $I_{y,Pre}(t)=real[E_{1y,Pre}(t)]$, $Q_{y,Pre}(t)=imag[E_{1y,Pre}(t)]$ | Output to two DACs: $I_{2x,Pre}(t)=real[E_{2x,Pre}(t)]$, $Q_{2x,Pre}(t)=imag[E_{2x,Pre}(t)]$ | Output to two DACs: $I_{2y,Pre}(t)=real[E_{2y,Pre}(t)]$, $Q_{2y,Pre}(t)=imag[E_{2y,Pre}(t)]$ |

| 700 | Get the received E-field of one polarization:<br><br>$E_{1x, RX} = I_{1x, RX} + j \cdot Q_{1x, RX}$ | Get the received E-field of one polarization:<br><br>$E_{1y, RX} = I_{1y, RX} + j \cdot Q_{1y, RX}$ | Get the received E-field of the other polarization:<br><br>$E_{2x, RX} = I_{2x, RX} + j \cdot Q_{2x, RX}$ | Get the received E-field of the other polarization:<br><br>$E_{2y, RX} = I_{2y, RX} + j \cdot Q_{2y, RX}$ ~ 701 |
|---|---|---|---|---|
| | Perform post-dispersion-compensation:<br><br>$E_{1x, Post} = H_{Post} \otimes E_{1x, RX}$ | Perform post-dispersion-compensation:<br><br>$E_{1y, Post} = H_{Post} \otimes E_{1y, RX}$ | Perform post-dispersion-compensation:<br><br>$E_{2x, Post} = H_{Post} \otimes E_{2x, RX}$ | Perform post-dispersion-compensation:<br><br>$E_{2y, Post} = H_{Post} \otimes E_{2y, RX}$ ~ 702 |
| | Synchronization in time and frequency | | Synchronization in time and frequency | ~ 703 |
| | Channel estimation and compensation to recover the original x- and y-fields:<br>$E_{1x}(t)$ and $E_{1y}(t)$ | | Channel estimation and compensation to recover the original x- and y-fields:<br>$E_{2x}(t)$ and $E_{2y}(t)$ | ~ 704 |
| | Coherently superimposing:<br>$E_{even}(t) = E_{1x}(t) + E_{2x}(t)^*$, $E_{odd}(t) = E_{1y}(t) + E_{2y}(t)^*$, | | | ~ 705 |
| | Interleave $E_{even}(t)$ and $E_{odd}(t)$ to obtain the original payload symbol sequence $E(t)$ | | | ~ 706 |
| | Renormalization, Demodulation and FEC decoding | | | ~ 707 |

*FIG. 7*

COMMUNICATION THROUGH PRE-DISPERSION-COMPENSATED PHASE-CONJUGATED OPTICAL VARIANTS

CROSS-REFERENCE TO RELATED APPLICATIONS

This application is a continuation-in-part of U.S. patent application Ser. No. 13/411,462, filed Mar. 2, 2012, which is a continuation-in-part of U.S. patent application Ser. No. 13/245,160, filed Sep. 26, 2011, which claims the benefit of U.S. Provisional Patent Application No. 61/535,548, filed Sep. 16, 2011, all of which are incorporated herein by reference in their entirety.

BACKGROUND

1. Field

The invention(s) relate to optical communication equipment and, more specifically but not exclusively, to equipment for managing data transport through a nonlinear and/or noisy optical channel.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Forward error correction (FEC) uses systematically generated redundant data to reduce the bit-error rate (BER) at the receiver. The cost of this reduction is a concomitant increase in the required forward-channel bandwidth, the latter being dependent on the overhead of the FEC code. In general, an FEC code with a larger overhead or lower net data rate is used for a noisier channel. When the channel conditions change over time, the net data rate and/or the FEC code can be adaptively changed to maintain an acceptable BER. However, one problem with FEC coding, as applied to optical transmission systems, is that the coding-gain differences among various implementable FEC codes usually do not exceed a certain maximum value, as given by Shannon's information capacity theory. In addition, the digital signal processing (DSP) complexity for capacity-approaching FEC codes can be forbiddingly high. Therefore, for certain optical channels, additional and/or alternative performance-enhancement techniques may be needed to overcome these and other pertinent limitations of FEC coding.

SUMMARY

Improvement in the quality of an optical signal after transmission may be obtained by performing digital constructive summation of a set of two or more optical variants. Optical variants are correlated optical signals which carry the same piece of payload data, bit-word, or bit sequence but differ from each other in at least one of their degrees of freedom, e.g., in one or more of the time of transmission, spatial localization, polarization of light, optical carrier wavelength and subcarrier frequency. The constructive summation tends to average out, to a certain degree, the deleterious effects of both linear and nonlinear noise/distortions imparted on the individual optical variants in the optical transmission link because said noise/distortions are incoherent in nature. The optical variants can be the same as the original optical signal intended for transmission, or phase-scrambled copies of original signal.

Nonlinear distortions imparted on two phase-conjugated signals during transmission can be essentially opposite to each other when the phase conjugation is removed at the receiver. Therefore, when two phase-conjugated optical variants carrying the same modulated payload symbols are coherently summed after removing the phase conjugation between them, the nonlinear distortions imparted on the two phase-conjugated optical variants would essentially cancel. It is further found that in highly dispersive transmission, application of a symmetric dispersion map may be additionally utilized in order to achieve effective cancellation of the nonlinear distortions imparted on the two phase-conjugated optical variants. The symmetric dispersion map can be realized by pre-compensating the phase-conjugated optical variants by an amount of dispersion that depends on the accumulated dispersion (e.g., power-weighted accumulated dispersion ($AD_{PW}$)) of a transmission link, through which the optical variants are to be transmitted. This methodology effectively improves signal quality after nonlinear dispersive transmission, beyond what can be achieved by coherently summing two optical variants that are either duplicated or phase-scrambled copies of a same optical signal.

In one embodiment, an apparatus comprises an optical transmitter, which comprises a processor configured to generate electronic representations of at least two pre-dispersion-compensated phase-conjugated optical variants carrying a same modulated payload data for transmission; and at least one optical modulator for modulating the electronic representations, wherein an amount of dispersion induced on the pre-dispersion-compensated phase-conjugated optical variants depends on an accumulated dispersion (AD) of a transmission link through which the pre-dispersion-compensated phase-conjugated optical variants are to be transmitted. The processor may be configured to generate the electronic representations by convolving an E-field representation with a pre-dispersion-compensation function.

In one embodiment, the amount of dispersion induced on the phase-conjugated optical variants through the pre-dispersion-compensation is approximately $-AD_{PW}/2$, where $AD_{PW}$ is the power-weighted accumulated dispersion of the transmission link. In another embodiment, the amount of dispersion induced on the phase-conjugated optical variants through the pre-dispersion-compensation is approximately negative one-half of the accumulated dispersion of the transmission link. The accumulated dispersion of the transmission link may be power weighted to account for the launch power into the various spans comprising the transmission link, since the launch power may not be uniform for each span of the transmission link.

In one embodiment, the at least two pre-dispersion-compensated phase-conjugated optical variants, upon exiting the transmitter, differ from one another in one or more of polarization, time of transmission, spatial localization, optical carrier wavelength, and subcarrier frequency. The digital representations of the at least two pre-dispersion-compensated phase-conjugated optical variants may be complex conjugates before being pre-dispersion compensated. In one embodiment, one digital representation of the at least two pre-dispersion-compensated phase-conjugated optical variants includes a complex conjugate version of the payload data for transmission with a constant phase rotation before being pre-dispersion compensated.

In one embodiment, the transmitter comprises two optical modulators configured to generate two orthogonally-polarized pre-dispersion-compensated phase-conjugated optical variants at a same wavelength. The same modulated payload data for transmission may use a modulation scheme selected from the group consisting of amplitude-shift keyed (ASK), phase-shift keyed (PSK), quadrature-amplitude modulated (QAM), or polarization-division-multiplexed (PDM) signals, or a combination thereof.

In one embodiment, the apparatus also includes a transmission link, which includes an optical pre-dispersion compensation module, an optical in-line dispersion compensation module, an optical post-dispersion compensation module, or a combination thereof. In one embodiment, the apparatus also includes a transmission link, which may be one or more of single-mode fiber, fiber bundle, multi-core-fiber, and multi-mode fiber. In another embodiment, the apparatus also includes a transmission link which includes an optically amplified transmission fiber span.

In one embodiment, the apparatus also includes an optical receiver for receiving versions of at least two pre-dispersion-compensated phase-conjugated optical variants. The optical receiver may comprises a front-end circuit configured to convert the received versions of at least two pre-dispersion-compensated phase-conjugated optical variants carrying same modulated payload data into a corresponding plurality of digital electrical signals; and a processor configured to: process the plurality of digital electrical signals to generate a set of complex values representing the same modulated payload data, sum the complex values of the set to generate a summed complex value, map the summed complex value onto a constellation, and determine based on the mapped summed complex value a data represented by the same modulated payload data.

In one embodiment, the processor configured to process the plurality of digital electrical signals to generate a set of complex values representing the same modulated payload data is configured to perform post-dispersion compensation on the received versions of at least two pre-dispersion-compensated phase-conjugated optical variants; and remove phase conjugation between the received versions of the at least two pre-dispersion-compensated phase-conjugated optical variants.

In one embodiment, the optical receiver comprises at least one polarization-diversity optical hybrid, one optical local oscillator, and four analog-to-digital convertors (ADCs).

In one embodiment, the processor configured to generate a set of complex values representing the same modulated payload symbol is configured to compensate for residual dispersion of the received versions of at least two pre-dispersion-compensated phase-conjugated optical variants. In another embodiment, the processor configured to process the plurality of digital electrical signals to generate the set of complex values representing the same modulated payload symbol is configured to perform one or more of time synchronization, channel estimation, channel compensation, frequency estimation, frequency compensation, phase estimation, and phase compensation.

In one embodiment, the apparatus also include a transmission link; and at least one phase-sensitive optical amplifier for amplifying at least two pre-dispersion-compensated phase-conjugated optical variants in the transmission link. The phase-sensitive optical amplifier is an optical parametric amplifier.

In one embodiment, the transmitter is configured to transmitted the pre-dispersion-compensated phase-conjugated optical variants on different paths for a same receiver and with a signal quality such that the payload data cannot be decoded with detection of a single pre-dispersion compensated phase-conjugated optical variant, the method thereby providing security of communication between the transmitter and a receiver.

According to one embodiment, the pre-dispersion-compensation is realized by digital signal processing modules that digitally pre-compensate the complex fields representing the phase-conjugated optical variants. In an embodiment, digital signal processing modules that digitally pre-compensate the complex fields representing the phase-conjugated optical variants utilize the overlap-and-add method.

According to another embodiment, pre-dispersion-compensation is realized by an optical dispersion compensation module (DCM) that optically pre-compensates the complex fields representing the phase-conjugated optical variants.

In another embodiment, the at least two pre-dispersion-compensated phase-conjugated optical variants can differ from one another in one or more of polarization, time, spatial localization, optical carrier wavelength, and subcarrier frequency during optical transmission. Two "phase-conjugated optical variants" refer to two optical variants that are complex conjugates after removing a constant phase offset and/or time delay between them. Further, more than two phase-conjugated optical variants may be utilized in the provided methodology; in those instances, the third, fourth, etc. phase-conjugated optical variant is a copy of one of first two complex conjugates after removing a constant phase offset and/or time delay from the third, fourth, etc. phase-conjugated optical variant.

According to one embodiment, at least two pre-dispersion-compensated phase-conjugated optical variants are orthogonally polarized, and are generated by a polarization-diversity transmitter and share the same wavelength and spatial path in an optical fiber transmission link. A polarization-diversity receiver is used to receive the at least two orthogonal polarization components and jointly process them to recover the transmitted optical variants. The recovery process includes post-dispersion-compensation to bring the overall dispersion experienced by the signals to approximately zero (e.g., essentially zero). Then, the phase conjugation between these two variants is removed, before the variants are constructively summed to provide a constellation representation of the original signal.

According to one embodiment, at least two pre-dispersion-compensated phase-conjugated optical variants for an optical signal intended for transmission are time delayed with respect to each other by $\tau$, which may be multiple modulation symbol periods, and modulated onto a polarization component of a Polarization Division Multiplexed (PDM) signal. At the receiver, the time delay and the phase conjugation between these two variants are removed, before their constructive summation to provide a constellation representation of the original signal.

According to one embodiment, at least two pre-dispersion-compensated phase-conjugated optical variants are modulated onto different optical carrier wavelengths, and are wavelength-division multiplexed for transmission. Each of the optical variants can be a polarization-division-multiplexed (PDM) signal. These wavelengths can travel through the same spatial path in an optical fiber transmission link. At the receiver, these optical variants are first wavelength-division de-multiplexed and jointly processed. Then, the phase conjugation between these variants is removed before they are constructively summed to provide a constellation representation of the original signal.

According to one embodiment, at least two pre-dispersion-compensated phase-conjugated optical variants are space-division multiplexed for transmission. These at least two optical variants can travel through different fiber paths, different cores of a multicore fiber link, different spatial modes of a multi-mode fiber, or different transmission paths as long as the nonlinear effects impacting them are approximately the same. At the receiver, these at least two optical variants are first space-division de-multiplexed, either optically or digitally, and jointly processed. Then, the phase conjugation between these at least two variants is removed, after which they are constructively summed to provide a constellation representation of the original signal.

As the linear noises impacting each of the optical variants are uncorrelated, the constructive summation process aforementioned also effectively increases the optical signal-to-noise (OSNR). Together with the cancellation of nonlinear distortions, the use of pre-dispersion-compensated phase-conjugated optical variants in a constructive summation process can substantially improve the signal quality in long-haul optical fiber transmission, regardless of the dispersion present in the transmission fiber.

In various embodiments, the signal quality improvement or the reduction in the received bit error ratio (BER) enabled by the use of optical variants can be implemented in addition to or instead of that provided by FEC coding.

In an embodiment, a method comprises generating, by a processor, digital representations of at least two pre-dispersion-compensated phase-conjugated optical variants carrying a same modulated payload data for transmission; and modulating, by at least one optical modulator, the digital representations, wherein an amount of dispersion induced on the pre-dispersion compensated phase-conjugated optical variants depends on an accumulated dispersion (AD) of a transmission link through which the pre-dispersion compensated phase-conjugated optical variants are to be transmitted. Generating the digital representations may include convolving an E-field representation with a pre-dispersion-compensation function. The amount of dispersion induced on the pre-dispersion-compensated phase-conjugated optical variants may be about −AD/2, where AD is the accumulated dispersion of the transmission link through which the phase-conjugated optical variants are to be transmitted. The accumulated dispersion may be a power-weighted accumulated dispersion of the transmission link through which the phase-conjugated optical variants are to be transmitted.

In one embodiment, generating the digital representations includes inducing dispersion by electronically pre-compensating complex fields representing phase-conjugated optical variants. In one embodiment, the pre-dispersion-compensated phase-conjugated optical variants are transmitted through different paths for a same receiver and with a signal quality such that the payload data cannot be decoded with detection of a single pre-dispersion compensated phase-conjugated optical variant, the method thereby providing security of communication between the transmitter and a receiver. The method may also include converting, at an optical receiver, received versions of at least two pre-dispersion-compensated phase-conjugated optical variants carrying same modulated payload data into a corresponding plurality of digital electrical signals; processing the plurality of digital electrical signals to generate a set of complex values representing the same modulated payload data; summing the complex values of the set to generate a summed complex value; mapping the summed complex value onto a constellation; and determining based on the mapped summed complex value a data represented by the same modulated payload data.

In yet another embodiment, an apparatus includes an optical transmitter comprising a processor configured to generate electronic representations of at least two phase-conjugated optical variants carrying a same modulated payload data for transmission; at least one optical modulator for modulating the electronic representations; and an optical dispersion compensator configured to provide pre-dispersion compensation of the modulated electronic representations, wherein the amount of dispersion compensated depends on an accumulated dispersion (AD) of a transmission link through which the modulated electronic representations are to be transmitted.

In an embodiment, the at least two pre-dispersion-compensated phase-conjugated optical variants are complex conjugates before the pre-dispersion compensation.

In an embodiment, the at least two pre-dispersion-compensated phase-conjugated optical variants include a complex conjugate version of the optical version of the symbol for transmission with a constant phase rotation before the pre-dispersion compensation.

In an embodiment, two optical modulators generate two orthogonally-polarized pre-dispersion-compensated phase-conjugated optical variants at a same wavelength.

In an embodiment, the processor of the receiver is further configured to compensate for the residual dispersion of the at least two phase-conjugated optical variants.

In one embodiment, the processor may determine the bit-word represented by the same modulated payload symbol by determining a FEC-based error correction based on a sequence of mapped constellations for a sequence of same modulated payload symbols. In another embodiment, processing the plurality of digital electrical signals to generate the set of complex values representing the same modulated payload symbol may include performing one or more of time synchronization, channel estimation, channel compensation, frequency estimation, frequency compensation, phase estimation, and phase compensation. This processing of the digital electrical signals may include the use of pilot symbols.

BRIEF DESCRIPTION OF THE DRAWINGS

Other aspects, features, and benefits of various embodiments of the invention will become more fully apparent, by way of example, from the following detailed description and the accompanying drawings, in which:

FIG. 2 shows a flowchart of a signal-processing method that can be implemented in the transmitter of the optical transmission system shown in FIG. 1 according to one embodiment of the invention;

FIG. 6 shows a flowchart of a signal-processing method that can be implemented in the transmitter of the optical transmission system shown in FIG. 4 and FIG. 5 according to one embodiment of the invention; and FIG. 7 shows a flowchart of a signal-processing method that can be implemented in the receiver of the optical transmission system shown in FIG. 4 and FIG. 5 according to one embodiment of the invention;

DETAILED DESCRIPTION

Figure 1:
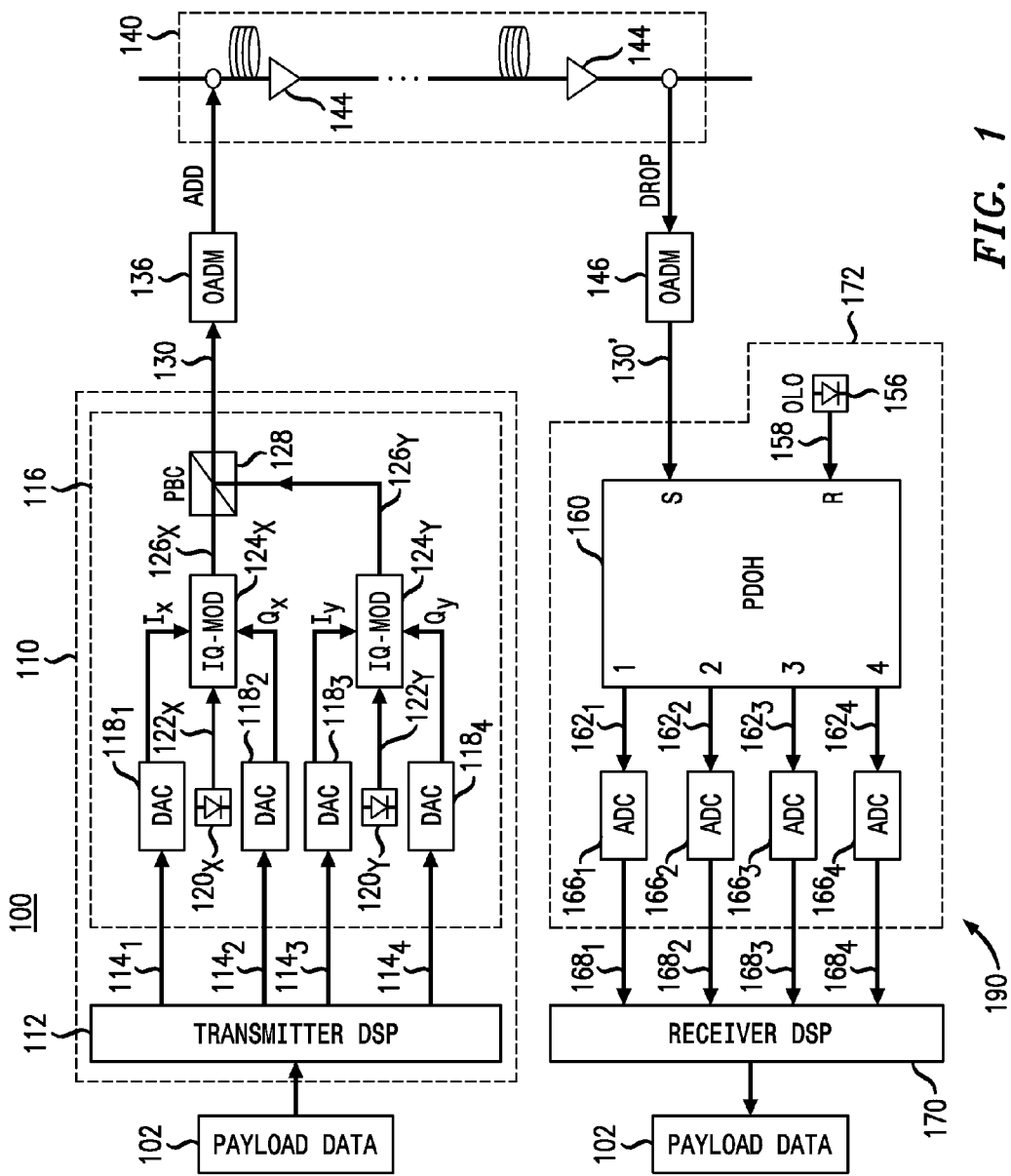
FIG. 1 shows a block diagram of an optical transmission system according to one embodiment of the invention.

Typical optical transmission links are able to support multiple degrees of freedom, such as time, space, carrier frequency (wavelength), and polarization. Each of these degrees of freedom can be used for optical-signal multiplexing. Multiplexing techniques corresponding to these four different individual degrees of freedom are referred to in the literature as time-division multiplexing, space-division multiplexing, wavelength-division multiplexing, and polarization-division multiplexing.

In addition to or instead of using the various degrees of freedom supported by an optical transmission link for multiplexed transmission of independent optical signals, various embodiments of the invention employ these degrees of freedom for the transmission of correlated optical signals, referred to as optical variants. In a representative embodiment, two optical variants are two optical signals that carry the same piece of payload data, bit-word, or bit sequence, but differ from each other in the way they carry the payload data: in a representative embodiment, these two optical variants are complex conjugates. Assuming that the E-field of an optical signal intended for transmission is E, the E-field of one of the two optical variants can be E, and the other can be E*, where "*" denotes complex conjugate.

Here, introduced is a more general term "phase-conjugated optical variants", which refers to two optical variants that are complex conjugates after removing a constant phase offset and/or time delay between them. By complex conjugates is meant a pair of complex numbers, both having the same real part, but with imaginary parts of equal magnitude and opposite signs. For example, $E_1(t)$ and $E_2(t)$ are phase-conjugated optical variants of an optical signal intended for transmission $E(t)$ when the following conditions are satisfied $$E_1(t-t_1)=\exp(j\phi_1)\cdot E(t),$$

$$E_2(t-t_2)=\exp(j\phi_2)\cdot E(t)^*, \quad (1)$$

where j denotes the imaginary unit, t denotes time, $t_1$ and $t_1$ are time offsets, and $\phi_1$ and $\phi_2$ are phase offsets. From the above equations, we have $$E_1(t-t_1)=\exp[j(\phi_1+\phi_2)]\cdot E_2(t-t_2)^*, \quad (2)$$

i.e., $E_1(t)$ and $E_2(t)$ are complex conjugates after removing a constant phase offset of $(\phi_1+\phi_2)$ and a time delay of $(t_1-t_2)$. When there are more than two phase-conjugated optical variants, the additional phase-conjugated optical variants take the form:

$$E_n(t-t_n)=\exp[j\phi_n(t)]\cdot E(t), \text{ or}$$

$$E_n(t-t_n)=\exp[j\phi_n(t)]\cdot E(t)^*, \quad (3)$$

where n is 3, 4, ..., and $\phi_n(t)$ can be a known phase sequence, e.g., a phase sequence that can be used for scrambling the phases of the optical variants.

Each of the optical variants can be further extended to be a vector signal, or a polarization-division-multiplexed (PDM) signal. In this case, the original signal E(t) can be in the form of a 2×1 vector $$E(t) = \begin{pmatrix} E_x(t) \\ E_y(t) \end{pmatrix}. \quad (4)$$

To generate "pre-dispersion-compensated" phase-conjugated optical variants, the E-fields of the original signal variants, $E_{n,\,Pre}(t)$, are effectively convolved with a pre-dispersion-compensation function $H_{Pre}(t)$ as follows $$E_{n,Pre}(t)=H_{Pre}(t)\otimes E_n(t) \quad (5)$$

where '⊗' denotes convolution as defined:

$$H(t)\otimes E(t) = \int_{-\infty}^{\infty} H(\tau)E(t-\tau)d\tau. \quad (6)$$

A convolution is the integral of the product of two functions after one is reversed and shifted producing a third function that is typically viewed as a modified version of one of the original functions, giving the area overlap between the two functions as a function of the amount that one of the original functions is translated. The above convolution operation can be simply realized in the frequency domain as $$H(t)\otimes E(t)=F^{-1}\{F[H(t)]\cdot F[E(t)]\}, \quad (7)$$

where F(x) is the Fourier transform of function x. The size of the discrete Fourier transform (DFT) and inverse DFT (IDFT) used to covert time-domain signal E-field to the frequency domain and back can vary between being at least the same size as the dispersion-induced channel memory length to 10 times such length, the size being chosen to balance processing latency and hardware requirements with acceptable accuracy. The size of the DFT and IDFT used to covert time-domain signal E-field to the frequency domain and back is usually a few times the dispersion-induced channel memory length. The frequency-domain dispersion compensation can be realized by using the overlap-and-add approach. A more detailed description on the overlap-and-add approach can be found in a paper entitled "Coherent optical single carrier transmission using overlap frequency domain equalization for long-haul optical systems," published in J. Lightwave Technol., 27, 3721-3728 (2009) by R. Kudo, T. Kobayashi, K. Ishihara, Y. Takatori, A. Sano, and Y. Miyamoto, which is incorporated herein by reference in its entirety.

The amount of dispersion induced on the phase-conjugated optical variants depends on the accumulated dispersion of a transmission link through which the phase-conjugated optical variants are to be transmitted. In one embodiment, the amount of dispersion induced on the phase-conjugated optical variants depends on the power-weighted accumulated dispersion $(AD_{PW})$ of a transmission link through which the phase-conjugated optical variants are to be transmitted. Power weighting of the accumulated dispersion of the transmission link accounts for the potential varying of launch power into the various spans comprising the transmission link, since the launch power may not be uniform for each span of the transmission link.

As an example, the power-weighted accumulated dispersion of a transmission link comprising multiple optically amplified homogenous fiber spans is defined as:

$$AD_{PW} = \frac{1}{L_{eff}} \int_0^L e^{G(z)} C(z) dz, \quad (8)$$

where L is the link distance, and C(z) is accumulated dispersion at distance z along the transmission link $$C(z) = \int_0^z \beta_2(z') dz', \quad (9)$$

where $\beta_2(z')$ is the group-velocity dispersion coefficient at distance z' along the link.

In the above equation, G(z) is the logarithmic loss/gain evolution of the optical signal $$G(z) = \int_0^z [g(z') - \alpha(z')] dz', \quad (10)$$

where $g(z')$ and $\alpha(z')$ are the gain and loss coefficients at distance z' along the transmission link, respectively, and $L_{eff}$ is the effective length of the transmission link $$L_{eff} = \int_0^L e^{G(z)} dz. \quad (11)$$

When the amount of dispersion induced on the phase-conjugated optical variants through the pre-dispersion-compensation is approximately $-AD_{PW}/2$ (or the dispersion map is made symmetric about zero dispersion (i.e., pre-dispersion compensation applied such that half way through the transmission link, the accumulated dispersion is zero), we have $$C(z) = -C(L-z), \quad (12)$$

and $$G(z) \approx G(L-z). \quad (13)$$

The dimensionless nonlinear transfer function, defined as $$\eta(\xi) = \frac{1}{L_{eff}} \int_0^L e^{G(z) - i\xi C(z)} dz, \quad (14)$$

then becomes essentially a real-valued number, when Eqs. (12) and (13) are applied, because $$\eta(\xi) = \frac{1}{L_{eff}} \int_0^{L/2} [e^{G(z) - i\xi C(z)} + e^{G(L-z) - i\xi C(L-z)}] dz \approx \quad (15)$$

$$\frac{1}{L_{eff}} \int_0^{L/2} 2e^{G(z)} \cos[\xi C(z)] dz.$$

This means that, for the case of transmission with the symmetric dispersion map, we have $$\eta(\xi) \approx \eta(\xi)^*. \quad (16)$$

Based on a perturbation approach, we can express the nonlinear distortion on the E-field of an optical signal (E) after the transmission in the frequency domain as $$\delta E(L, \omega) = i\frac{8}{9}\gamma P_0 L_{eff} \int_{-\infty}^{+\infty} d\omega_1 \int_{-\infty}^{+\infty} d\omega_2 \eta(\omega_1 \omega_2) E(\omega + \omega_1) E(\omega + \omega_2) E^*(\omega + \omega_1 + \omega_2), \quad (17)$$

where i is the imaginary unit, * denotes complex conjugate, $P_0$, $\gamma$ are respectively the fiber nonlinear Kerr coefficient and mean average signal launch power into each fiber span. This constitutes the nonlinear distortion on the E-field of a first pre-dispersion compensated phase-conjugated optical variant.

Since at least two pre-dispersion compensated phase-conjugated optical variants are transmitted according to embodiments of the invention, we can also express the nonlinear distortion on the E-field of the second pre-dispersion compensated phase-conjugated optical variant (E*), (i.e., the twin wave of the first optical signal (E)) as $$\delta E^*(L, \omega) = i\frac{8}{9}\gamma P_0 L_{eff} \int_{-\infty}^{+\infty} d\omega_1 \int_{-\infty}^{+\infty} d\omega_2 \eta(\omega_1 \omega_2) E^*(\omega + \omega_1) E^*(\omega + \omega_2) E(\omega + \omega_1 + \omega_2) \quad (18)$$

$$= \left[ -i\frac{8}{9}\gamma P_0 L_{eff} \int_{-\infty}^{+\infty} d\omega_1 \int_{-\infty}^{+\infty} d\omega_2 \eta^*(\omega_1 \omega_2) E(\omega + \omega_1) E(\omega + \omega_2) E^*(\omega + \omega_1 + \omega_2) \right]^*$$

$$\approx [-\delta E(L, \omega)]^*$$

In the last derivation of the above equation, we use the fact that $\eta(\omega_1 \omega_2)$ is essentially real-valued, or $\eta(\omega_1 \omega_2) \approx \eta(\omega_1 \omega_2)^*$, based on Eq. (16). The above equation reveals that the nonlinear distortions experienced by two phase-conjugated optical variants are opposite to each other or anti-correlated (after their phase conjugation relation is removed), i.e., $$\delta E(L, \omega) \approx -[\delta E^*(L, \omega)]^*. \quad (19)$$

So, the full cancellation of nonlinear distortions upon coherent superposition of the received phase-conjugated optical variants is evident from $$E(L) + [E^*(L)]^* = [E + \delta E(L)] + [E^* + \delta E^*(L)]^* \approx 2E \quad (20)$$

It is remarkable that the above cancellation of nonlinear distortions is achieved even in the presence of large dispersion during fiber transmission (because the nonlinear distortions at different link locations are different due to the different accumulated dispersion values at these locations), when an appropriate amount of dispersion is induced on the phase-conjugated optical variants at the transmitter side through pre-dispersion-compensation to make the link dispersion map symmetric about zero dispersion.

These two pre-dispersion-compensated phase-conjugated optical variants are transmitted over an optical transmission link in different dimensions, e.g., in one or more of the time of transmission, spatial localization, polarization of light, optical carrier wavelength, and subcarrier frequency. For example, a first transmission of an optical symbol using a first (e.g., X) polarization and a second transmission of that same optical symbol using a second (e.g., Y) polarization represent two different optical variants of the bit-word that the optical symbol encodes. As a second example, a first transmission of an optical symbol at time t1 and a second transmission of that same optical symbol at time t2>t1 represent two different optical variants of the bit-word that the optical symbol encodes. As a third example, a first transmission of an optical symbol using carrier wavelength $\lambda_1$ and a second (e.g., concurrent) transmission of that optical symbol using carrier wavelength $\lambda_2$ similarly represent two different optical variants of the bit-word that the optical symbol encodes. As a fourth example, a first transmission of an optical symbol via a first propagation path of a multipath fiber or fiber-optic cable (e.g., via a first core of a multi-core fiber or a first guided mode of a multi-mode fiber) and a second transmission of that optical symbol via a second propagation path of that multipath fiber or fiber-optic cable (e.g., via a second core of the multi-core fiber or a second guided mode of the multi-mode fiber) represent two different optical variants of the bit-word that the optical symbol encodes.

Note that, in each of these examples, the two corresponding optical variants are described as differing from one another in the parameters of just one degree of freedom. However, optical variants may differ from one another in the parameters of two or more degrees of freedom, such as: (i) polarization and time; (ii) time and space; (iii) time and wavelength; (iv) space and wavelength; (v) space and polarization; (vi) wavelength and polarization; (vii) time, space, and wavelength; (viii) time, space, and polarization; (ix) time, wavelength, and polarization; (x) space, wavelength, and polarization; or (xi) time, space, wavelength, and polarization.

The concept of optical variants also applies to (i) optical symbol sequences that carry multiple bit-words and (ii) optical signals that carry the same bit-word using different optical symbols. Further, more than two phase-conjugated optical variants may be transmitted/received over an optical path according to the principles of the invention. Assuming that the E-field of an optical signal intended for transmission is E, the E-field of the third, fourth, etc. optical variant can be either E or E*, where * denotes complex conjugate. As described above, optical variants are complex conjugates when they are equivalent after removal of a constant phase offset and/or time delay. Other pertinent features of "optical variants" will become more fully apparent, by way of example, from the following more detailed description that is given below in reference to FIGS. 1-7. Herein, the terms "optical variants" and phase-conjugated optical variants" will be used to refer to optical variants that have been phase-conjugated, variants that have been phase-conjugated and pre-dispersion compensated, and variants that have been pre-dispersion compensated by opposite dispersions and then phase-conjugated.

Various embodiments rely on an inventive concept, according to which the receiver adds, in a phase-coherent manner, the electrical signals corresponding to at least two phase-conjugated optical variants, which may be pre-dispersion-compensated phase-conjugated optical variants, of the same symbol stream prior to de-modulation and de-coding. Each pair of phase-conjugated variants are conveyed from the transmitter to the receiver on orthogonal transmission paths or dimensions, but experience similar nonlinear effects, which in effect impart opposite nonlinear distortions on these variants when the phase conjugation between the pair is removed. Accordingly, while the number of phase-conjugated optical variants utilized in any one embodiment may be even or odd, the use of a larger number of phase-conjugated optical variants is preferable to minimize nonlinear effects when the number is odd.

FIG. 1 shows a block diagram of an optical transmission system 100 according to one embodiment of the invention. System 100 has an optical transmitter 110 that is configured to transmit optical variants that differ from each other in polarization or time, or both. System 100 also has an optical receiver 190 that is configured to process the received optical variants to recover the corresponding original data in a manner that reduces the BER compared to the BER attainable without the use of optical variants. Transmitter 110 and receiver 190 are connected to one another via an optical transmission link 140.

Transmitter 110 receives an input stream 102 of payload data and applies it to a digital signal processor (DSP) 112. Processor 112 processes input stream 102 to generate digital signals $114_1$-$114_4$. In each signaling interval (time slot), signals $114_1$ and $114_2$ carry digital values that represent the in-phase (I) component and quadrature (Q) component, respectively, of a corresponding constellation symbol intended for transmission using X-polarized light. Signals $114_3$ and $114_4$ similarly carry digital values that represent the I and Q components, respectively, of the corresponding constellation symbol intended for transmission using Y-polarized light.

An electrical-to-optical (E/O) converter (also sometimes referred to as a front end) 116 of transmitter 110 transforms digital signals $114_1$-$114_4$ into a modulated optical output signal 130. More specifically, digital-to-analog converters (DACs) $118_1$ and $118_2$ transform digital signals $114_1$ and $114_2$ into an analog form to generate drive signals $I_X$ and $Q_X$, respectively. Drive signals $I_X$ and $Q_X$ are then used, in a conventional manner, to drive an I-Q modulator $124_X$. Based on drive signals $I_X$ and $Q_X$, I-Q modulator $124_X$ modulates an X-polarized beam $122_X$ of light supplied by a laser source $120_X$, thereby generating a modulated optical signal $126_X$.

DACs $118_3$ and $118_4$ similarly transform digital signals $114_3$ and $114_4$ into an analog form to generate drive signals $I_Y$ and $Q_Y$, respectively. Based on drive signals $I_Y$ and $Q_Y$, an I-Q modulator $124_Y$ modulates a Y-polarized beam $122_Y$ of light supplied by a laser source $120_Y$, thereby generating a modulated optical signal $126_Y$. A polarization beam combiner 128 combines modulated optical signals $126_X$ and $126_Y$ to generate optical output signal 130.

In a representative configuration, processor 112 generates digital signals $114_1$-$114_4$ so that, for each bit-word to be transmitted to receiver 190, optical output signal 130 contains at least two phase-conjugated optical variants carrying that bit-word. The at least two phase-conjugated optical variants may be pre-dispersion-compensated phase conjugated optical variants. Conceptually, this set of pre-dispersion-compensated phase-conjugated optical variants can be viewed as comprising one or more overlapping and/or non-overlapping subsets. For example, there might be a subset consisting of two or more pre-dispersion-compensated phase-conjugated optical variants, in which the pre-dispersion-compensated phase-conjugated optical variants have the same polarization, but different temporal positions in signal 130. Alternatively or in addition, there might be another subset consisting of two pre-dispersion-compensated phase-conjugated optical variants, in which the pre-dispersion-compensated phase-conjugated optical variants have the same temporal position (the same time slot) in signal 130, but different polarizations. Furthermore, there might be yet another subset consisting of pre-dispersion-compensated phase-conjugated optical variants, in which the pre-dispersion-compensated phase-conjugated optical variants have different temporal positions in signal 130 and different polarizations.

In one embodiment, two pre-dispersion-compensated phase-conjugated optical variants are carried by orthogonal polarization components. In this case, signals $114_1$, $114_2$, $114_3$, and $114_3$ can be arranged to meet the following conditions $$I_{x,Pre}(t)=\text{real}(E_{x,Pre}(t)), Q_{x,Pre}(t)=\text{imag}(E_{x,Pre}(t)),$$

$$I_{y,Pre}(t)=\text{real}(E_{y,Pre}(t)), Q_{y,Pre}(t)=\text{imag}(E_{y,Pre}(t)), \quad (21)$$

where $E_{x,Pre}$ and $E_{y,Pre}$ are is the E-fields of pre-dispersion-compensated phase-conjugated optical variants $$E_{x,Pre}(t)=H_{Pre}(t) \otimes E(t),$$

$$E_{y,Pre}(t)=H_{Pre}(t) \otimes E^*(t-\tau), \quad (22)$$

where $H_{Pre}(t)$ is the time response of the pre-dispersion-compensator. As discussed before, the pre-dispersion-compensation can be implemented in the frequency domain, using, e.g., the overlap-and-add approach.

The processor 112 may also add pilot symbols and/or pilot-symbol sequences to each of signals $114_1$, $114_2$, $114_3$, and $114_3$. One purpose of the added pilot symbols and/or pilot-symbol sequences is to form an optical frame having a well-defined structure. This structure can be used at receiver 190 to distinguish the optical symbols corresponding to the payload data from the pilot symbols/sequences, and to ensure the phase alignment between the optical variants. The pilot symbols/sequences can then be used to perform one or more of (i) time synchronization, (ii) channel estimation and compensation, (iii) frequency estimation and compensation, and (iv) phase estimation and compensation. An enabling description of possible frame structures and suitable pilot symbols/sequences can be found, e.g., in commonly owned U.S. patent application Ser. No. 12/964,929 (filed on Dec. 10, 2010), which is incorporated herein by reference in its entirety.

System 100 has an optical add-drop multiplexer (OADM) configured to add signal 130, as known in the art, to other optical signals that are being transported via optical transmission link 140. Link 140 is illustratively shown as being an amplified link having a plurality of optical amplifiers 144 configured to amplify the optical signals that are being transported through the link, e.g., to counteract signal attenuation. Note that an optical link that does not have optical amplifiers can alternatively be used as well. After propagating the intended length of link 140, signal 130 is dropped from the link via another optical add-drop multiplexer, OADM 146, and directed to receiver 190 for processing. Note that the optical signal applied to receiver 190 by OADM 146 is labeled 130', which signifies the fact that, while in transit between transmitter 110 and receiver 190, signal 130 may accumulate noise and other signal distortions due to various linear effects and nonlinear effects in the optical fiber. One type of a fiber nonlinear effect is intra-channel four-wave mixing (IFWM), which is a function of the phases and amplitudes of the corresponding optical symbols. Another type of a fiber nonlinear effect is inter-channel cross-phase modulation (XPM) caused by neighboring wavelength-division multiplexed (WDM) channels.

Receiver 190 has a front-end circuit 172 comprising an optical-to-electrical (O/E) converter 160, four analog-to-digital converters (ADCs) $166_1$-$166_4$, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by optical local oscillator 156. Reference signal 158 has substantially the same optical-carrier frequency (wavelength) as signal 130'. Reference signal 158 can be generated, e.g., using a tunable laser controlled by a wavelength-control loop (not explicitly shown in FIG. 1) that forces an output wavelength of the tunable laser to closely track the carrier wavelength of signal 130'.

OLE converter 160 operates to mix input signal 130' and reference signal 158 to generate eight mixed optical signals (not explicitly shown in FIG. 1). OLE converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog in-phase signal and an analog quadrature-phase signal, respectively, corresponding to the X-polarization component of signal 130'. Electrical signals $162_3$ and $162_4$ may similarly be an analog in-phase signal and an analog quadrature-phase signal, respectively, corresponding to the Y-polarization component of signal 130'.

In one embodiment, OLE converter 160 is a polarization-diverse 90-degree optical hybrid (PDOH) with four balanced photo-detectors coupled to its eight output ports. Additional information on various OLE converters that can be used to implement OLE converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals $162_1$-$162_4$ generated by OLE converter 160 is converted into digital form in a corresponding one of ADCs $166_1$-$166_4$. Optionally, each of electrical signals $162_1$-$162_4$ may be amplified in a corresponding amplifier (not explicitly shown) prior to the resulting signal being converted into digital form. Digital signals $168_1$-$168_4$ produced by ADCs $166_1$-$166_4$ are processed by a digital signal processor (DSP) 170, e.g., as further described below in reference to FIG. 3, to recover the data of the original input stream 102 applied to transmitter 110.

While the transmitter 110 of the illustrated system 100 is shown as having the ability to transmit a polarization multiplexed optical signal, as noted above, phase conjugated optical variants may be separated in time. According, in one embodiment, transmitter 110 includes hardware for generating a single polarization, for example X polarized light. In that embodiment, transmitter DSP 112 processes input stream 102 to generate digital signals $114_1$-$114_2$, which are converted to analog and modulated to provide a first phase-conjugated optical variant. At a later time, transmitter DSP 112 generates a second set of digital signals $114_1$-$114_2$ for the processed input stream which digital signals are converted to analog and modulated to provide a second phase-conjugated optical variant according to the principles of the invention.

FIG. 2 shows a flowchart of a signal-processing method 200 that can be employed by processor 112 (FIG. 1) to generate digital signals $114_1$-$114_4$ according to one embodiment of the invention where pre-dispersion-compensated phase-conjugated optical variants are carried on two orthogonal polarization states of a same wavelength channel.

At step 201 of method 200, payload data 102 are processed to obtain the payload signal sequence, E(t), using a given modulation format. The modulation format used can be selected from the group consisting of amplitude-shift keyed (ASK), phase-shift keyed (PSK), or quadrature-amplitude modulation (QAM) signals, such as 8-QAM and 16-QAM, or any suitable combination thereof. Other modulation formats may also be utilized.

At step 202 of method 200, the payload signal sequence E(t) and its phase-conjugated variant E*(t−τ) are respectively assigned to the x-polarization and y-polarization components of the optical signal to be modulated.

At step 203 of method 200, training symbols and pilot symbols are inserted to aid the recovery of the phase-conjugated optical variants at receiver 190.

At step 204 of method 200, pre-dispersion compensation is applied to the E-fields of both x- and y-polarization components of the optical signal to be modulated. The amount of dispersion induced by the pre-dispersion compensation may be about $-AD_{PW}/2$, where $AD_{PW}$ is the power-weighted accumulated dispersion of optical fiber transmission link 140. In one embodiment, the amount of dispersion induced by the pre-dispersion compensation is preferably about $-AD_{PW}/2$, where $AD_{PW}$ is the power-weighted accumulated dispersion of optical fiber transmission link 140. The pre-dispersion compensation can be implemented in the frequency domain using, e.g., the overlap-and-add approach. In certain embodiments, no pre-dispersion compensation is employed such that step 204 is optional. In other embodiments, the order of performance of phase conjugation and pre-dispersion compensation is switched. For example, two pre-dispersion-compensated phase conjugated optical variants may be formed by 1) generating (E,E*) first and then compensating each by a same amount of dispersion D, or (2) generating E, and compensating it by D for one variant; and compensating E by –D, and taking the complex conjugate to obtain the other variant.

At step 205 of method 200, the digital representations of the real and imaginary parts of the E-field of the x-polarization component are converted into analog waveforms by DACs $118_1$ and $118_2$. At the same time, the digital representations of the real and imaginary parts of the E-field of the y-polarization component are converted into analog waveforms by DACs $118_3$ and $118_4$.

Figure 3:
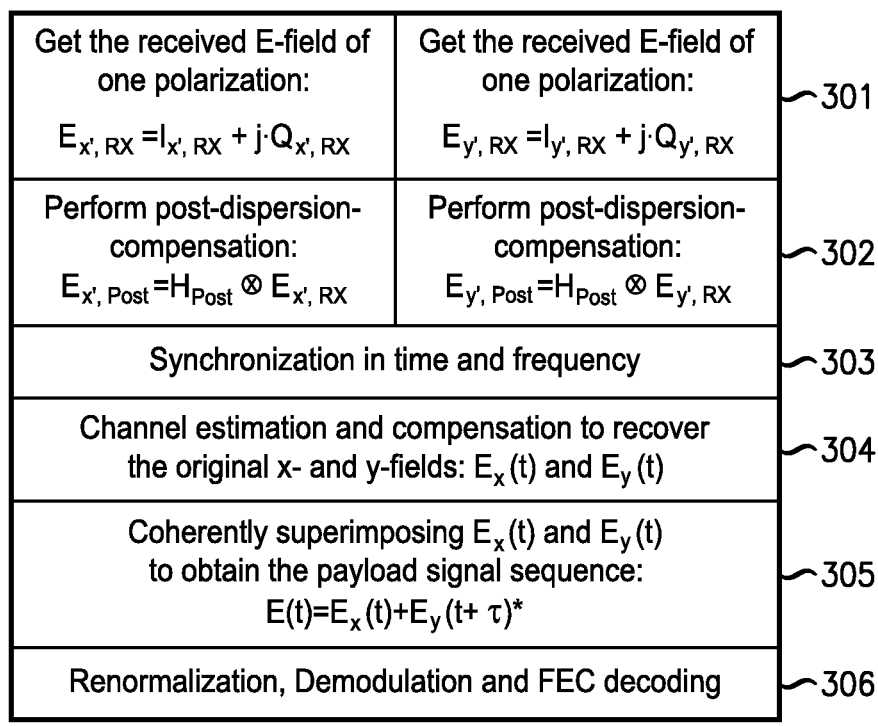
FIG. 3 shows a flowchart of a signal-processing method that can be implemented in the receiver of the optical transmission system shown in FIG. 1 according to one embodiment of the invention.

FIG. 3 shows a flowchart of a signal-processing method 300 that can be employed by processor 170 (FIG. 1) to recover data stream 102 from digital signals $168_1$-$168_4$ according to one embodiment of the invention where pre-dispersion-compensated phase-conjugated optical variants are carried on two orthogonal polarization states of a same wavelength channel.

At step 301 of method 300, digital signals $168_1$-$168_4$ are processed to construct two received optical fields corresponding to two orthogonal polarization components, $E_{x',RX}(t)$ and $E_{Y',RX}(t)$.

At step 302 of method 300, post-dispersion compensation is applied to the E-fields of both x'- and y'-polarization components of the received optical signal. The amount of dispersion induced by the post-dispersion compensation is preferably chosen to bring the overall dispersion experienced by the signal variants to essentially zero. The post-dispersion compensation can be implemented in the frequency domain, e.g., by using the overlap-and-add approach.

At step 303 of method 300, digital signal processing is applied to achieve time and frequency synchronization. In a representative implementation, the time-synchronization procedure of step 303 relies on certain properties of pilot-symbol sequences to determine the start of each optical frame. The known structure of the optical frame can then be used to identify time slots that have digital samples and/or digital-signal portions corresponding to the optical symbols carrying the payload data. The frequency-synchronization procedure of step 303 may perform electronic estimation and compensation of a mismatch between the carrier-frequency of input signal 130' and the frequency of reference signal 158 (see FIG. 1). After the frequency offset is determined, frequency-mismatch can be compensated, e.g., by applying to each digital sample a phase shift equal to the frequency offset multiplied by $2\pi$ and the time elapsed between the start of the frame and the temporal position of the digital sample.

At step 304 of method 300, additional signal processing is applied to achieve channel estimation and compensation, and phase estimation and compensation to recover the E-fields of the original x- and y-polarization components, $E_x(t)$ and $E_y(t)$, as assigned at transmitter 110. The channel-estimation/compensation procedure of step 304 performs electronic estimation and compensation of the phase and amplitude distortions imposed by optical fiber transmission link 140, due to effects such as chromatic dispersion and polarization-mode dispersion. In one embodiment, the channel estimation relies on digital samples corresponding to pilot symbols to determine the channel-response function, H, of optical fiber transmission link 140. The inverse channel-response function $H^{-1}$ is then applied to the digital samples corresponding to payload data to perform channel compensation. In another embodiment, the channel estimation relies on blind adaptive equalization.

At step 304, phase estimation and phase compensation are also performed, e.g., through the assistance of pilot symbols to correct or compensate for slowly changing phase shifts between input signal 130' and reference signal 158 (FIG. 1). Various methods that can be used for this purpose are disclosed, e.g., in U.S. Patent Application Publication Nos. 2008/0152361 and 2008/0075472 and U.S. Pat. No. 7,688,918, all of which are incorporated herein by reference in their entirety. In this manner the plurality of digital electrical signals are processed to generate a set of complex values representing a modulated payload symbol.

In another embodiment, the channel estimation relies on blind adaptive equalization and step 304 additional aligns the streams in time ($\tau$) and phase (in the case of arbitrary $\pi/2$ phase rotations). In one embodiment, a single (joint) frequency and phase tracking algorithm is utilized for the variants.

At step 305, the recovered E-fields of phase-conjugated optical variants are further processed to remove the phase conjugation between them, followed by coherent summation. The coherent summation forms an aggregate constellation that is used for further processing. For the transmitter embodiment described by Eq. (22), step 305 is configured to obtain the original optical signal intended for transmission (omitting a trivial scaling factor) as follows $$E(t)=E_x(t)+E_Y(t+\tau)^*. \quad (23)$$

At step 306, the recovered original optical signal field intended for transmission, E(t), is renormalized, and either directly or with reduced resolution fed into a soft-decision FEC, or hard symbol decisions are made and symbol-to-bit demapping is done, followed by hard-decision FEC to obtain payload data 102.

Figure 4:
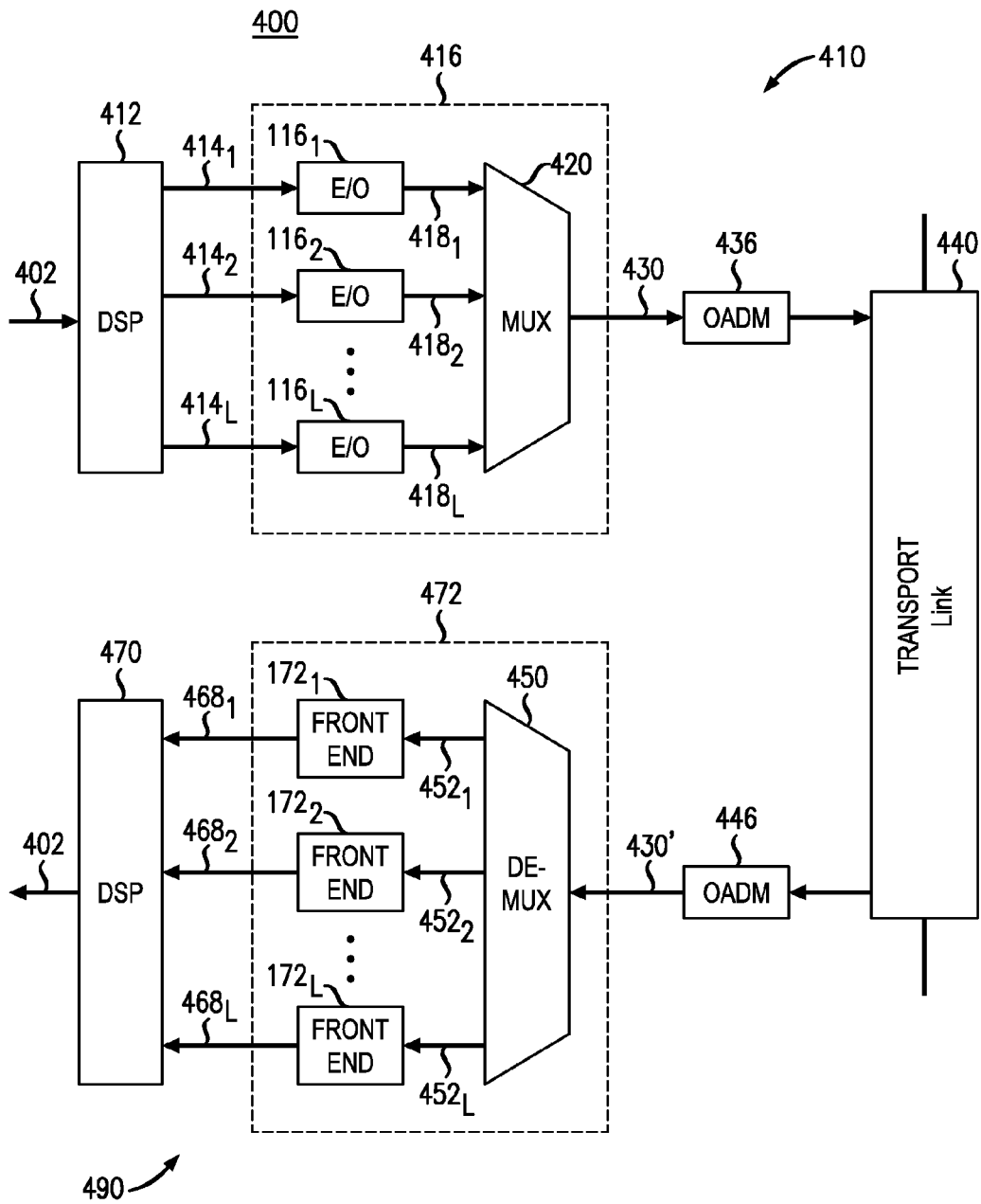
FIG. 4 shows a block diagram of an optical transmission system according to another embodiment of the invention.

FIG. 4 shows a block diagram of an optical transmission system 400 according to another embodiment of the invention. System 400 has an optical transmitter 410 that is configured to transmit pre-dispersion-compensated phase-conjugated optical variants that differ from each other in one or more dimensions such as time, space, polarization, carrier wavelength, or subcarrier frequency in frequency-division multiplexed (FDM) systems. System 400 also has an optical receiver 490 that is configured to process the received optical variants to recover the corresponding original data in a manner that reduces the BER compared to the BER attainable without the use of optical variants. Transmitter 410 and receiver 490 are connected to one another via an optical fiber transmission link 440.

Transmitter 410 has a front-end circuit 416 having L electrical-to-optical (E/O) converters $116_1$-$116_L$ (also see FIG. 1), each configured to use a different respective carrier wavelength selected from a specified set of wavelengths $\lambda_1$-$\lambda_L$. Transmitter 410 further has a wavelength multiplexer (MUX) 420 configured to combine optical output signals $418_1$-$418_L$ generated by E/O converters $116_1$-$116_L$, respectively, and apply a resulting WDM signal 430 to an OADM 436 for adding it to the signals that are being transmitted through fiber link 440.

Each of E/O converters $116_1$-$116_L$ generates its respective optical output signal 418 based on a corresponding set 414 of digital signals supplied by a DSP 412. Each signal set 414 has four electronic signals that are analogous to digital signals $114_1$-$114_4$ (FIG. 1). Signal sets $414_1$-$414_L$ are generated by DSP 412 based on an input data stream 402. When each of E/O converters $116_1$-$116_L$ generates two pre-dispersion-compensated phase-conjugated optical variants, the total number of pre-dispersion-compensated phase-conjugated optical variants is 2 L.

After propagating through link 440, signal 430 is dropped from the link (as signal 430') via another optical add-drop multiplexer, OADM 446, and directed to receiver 490 for processing. Receiver 490 has a front-end circuit 472 comprising a wavelength de-multiplexer (DEMUX) 450 and L front-end circuits $172_1$-$172_L$ (also see FIG. 1). Wavelength de-multiplexer (DEMUX) 450 is configured to de-multiplex signal 430' into its constituent WDM components $452_1$-$452_L$, each having a corresponding one of carrier wavelengths $\lambda_1$-$\lambda_L$. Each of front-end circuits $172_1$-$172_L$ then processes the corresponding one of signals $452_1$-$452_L$, as described above in reference to FIG. 1, to generate a corresponding one of sets $468_1$-$468_L$ of digital signals, with each set consisting of four digital signals analogous to digital signals $168_1$-$168_4$, respectively (see FIG. 1).

Signal sets $468_1$-$468_L$ generated by front-end circuit 472 are processed by a DSP 470 to recover the data of original input stream 402 applied to transmitter 410.

Figure 5:
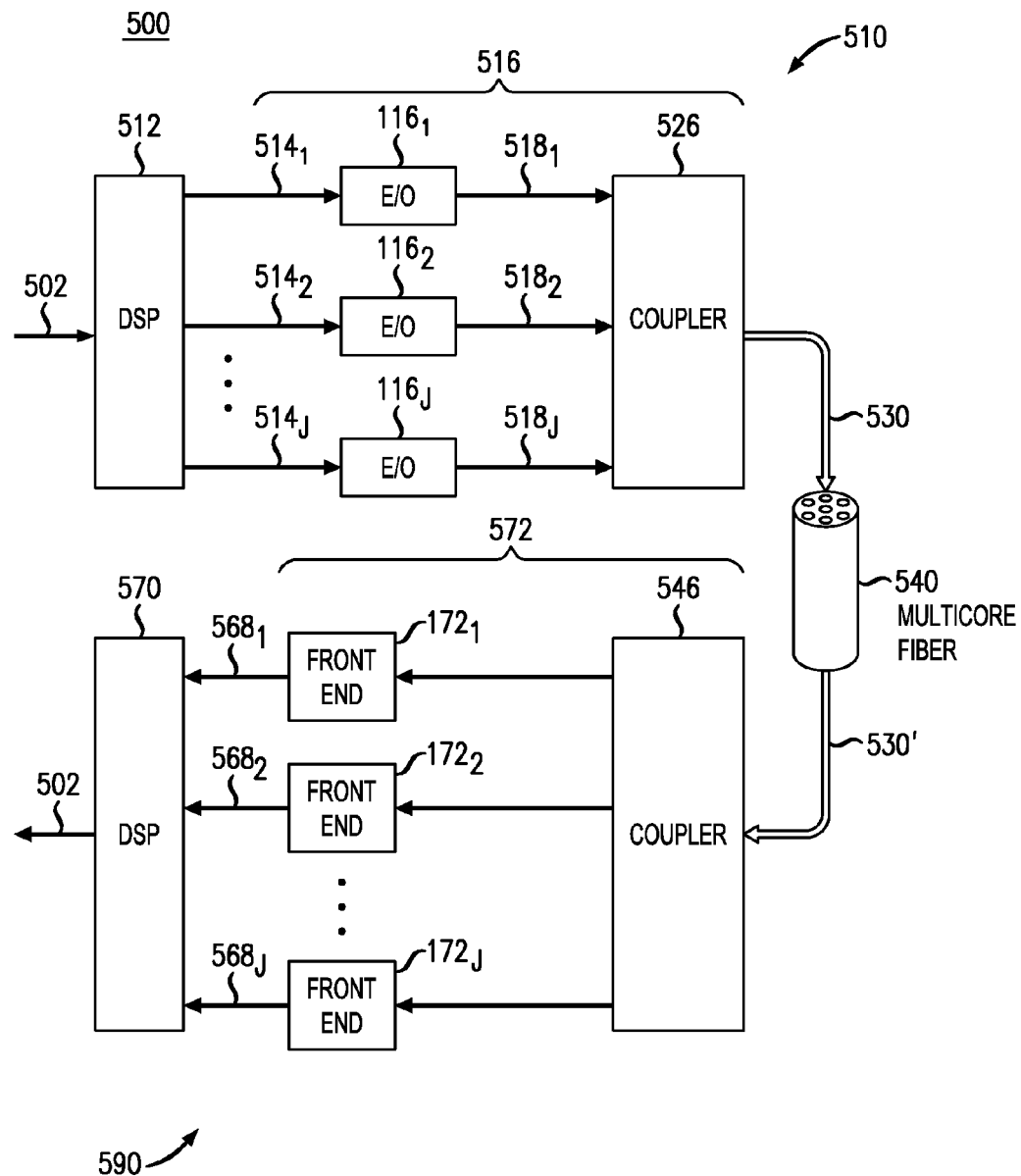
FIG. 5 shows a block diagram of an optical transmission system according to yet another embodiment of the invention.

FIG. 5 shows a block diagram of an optical transmission system 500 according to yet another embodiment of the invention. System 500 has an optical transmitter 510 that can be configured to transmit optical variants, including phase-conjugated optical variants and pre-dispersion-compensated phase-conjugated optical variants, that differ from each other in one or more dimensions such as time, polarization, and space (as represented by a plurality of different propagation paths). System 500 also has an optical receiver 590 that is configured to process the received optical variants to recover the corresponding original data in a manner that reduces the BER compared to the BER attainable without the use of optical variants. Transmitter 510 and receiver 590 are connected to one another via an optical fiber transmission link comprising a multi-core fiber 540, different cores of which provide the plurality of propagation paths.

Transmitter 510 has a front-end circuit 516 having L electrical-to-optical (E/O) converters $116_1$-$116_J$ (also see FIG. 1), each configured to use a different respective spatial path. Transmitter 510 further has an optical coupler 526 configured to couple optical output signals $518_1$-$518_J$ generated by E/O converters $116_1$-$116_J$, respectively, into corresponding cores of multi-core fiber 540.

Each of E/O converters $116_1$-$116_J$ generates its respective optical output signal 418 based on a corresponding set 514 of digital signals supplied by a DSP 512. Each signal set 514 has four electronic signals that are analogous to digital signals $114_1$-$114_4$ (FIG. 1). Signal sets $514_1$-$514_J$ are generated by DSP 412 based on an input data stream 402. When each of E/O converters $116_1$-$116_J$ generates one vector optical variant, the total number of phase-conjugated optical variants is then J.

After propagating through multi-core fiber 540, signal 530 is applied (as signal 530') to receiver 590 for processing. Receiver 590 has an optical coupler 546 and a front-end circuit 572 comprising J front-end circuits $172_1$-$172_J$ (also see FIG. 1). Optical coupler 546 is configured to direct light from each core of multi-core fiber 540 to a corresponding one of front-end circuits $172_1$-$172_J$. Each of front-end circuits $172_1$-$172_J$ then processes the signal received from optical coupler 546, as described above in reference to FIG. 1, to generate a corresponding one of sets $568_1$-$568_J$, each having four digital signals analogous to digital signals $168_1$-$168_4$, respectively (see FIG. 1). In one embodiment, front-end circuits $172_1$-$172_J$ in receiver 590 share a single common OLO 156 (see FIG. 1).

Signal sets $568_1$-$568_J$ generated by front-end circuit 572 are processed by DSP 570 to recover the data of original input stream 502 applied to transmitter 510.

FIG. 6 shows a flowchart of a transmitter signal-processing method 600 that can be employed by processor 412 (FIG. 4) or 512 (FIG. 5) to generate analog drive signals $414_1$-$468_L$ or $514_1$-$514_J$ according to another embodiment of the invention where optical variants, including phase-conjugated vector optical variants and pre-dispersion-compensated phase-conjugated vector optical variants, are carried by wavelength channels or by different spatial paths.

At step 601 of method 600, payload data 402 or 502 are processed to obtain the payload signal sequence, E(t), using a given modulation format.

At step 602 of method 600, the payload signal sequence E(t) is de-interleaved into two equal-length sequences, $E_{even}(t)$ and $E_{odd}(t)$.

At step 603 of method 600, $E_{even}(t)$ and $E_{odd}(t)$ are respectively assigned to the x-polarization and y-polarization components of a first vector optical variant $(E_{1x}, E_{1y})^T$, where $(\ )^T$ denotes matrix transpose. At the same time, their complex conjugates, $E_{even}(t)^*$ and $E_{odd}(t)^*$ are respectively assigned to the x-polarization and y-polarization components of a second vector optical variant $(E_{2x}, E_{2y})^T$.

At step 604 of method 600, training symbols and pilot symbols are inserted to aid the recovery of the phase-conjugated optical variants at receiver 490 or 590.

At step 605 of method 600, pre-dispersion compensation applied to the E-fields of both x- and y-polarization components of the vector optical signal variants to be modulated. In one embodiment, the amount of dispersion induced by the pre-dispersion compensation is about $-AD/2$, where AD is the accumulated dispersion of optical fiber transmission link 440 or 540. In another embodiment, the amount of dispersion induced by the pre-dispersion compensation is preferably about $-AD_{PW}/2$, where $AD_{PW}$ is the power-weighted accumulated dispersion of optical fiber transmission link 440 or 540. In another embodiment, no pre-dispersion compensation is undertaken, and optical variants that are phase-conjugated are provided to step 606.

At step 606 of method 600, the digital representations of the real and imaginary parts of the E-fields of the x- and y-polarization components of each vector optical variant are output to the DACs imbedded in one of the E/O converters $116_1$-$116_L$ (FIG. 4) or $116_1$ and $118_J$ (FIG. 5).

FIG. 7 shows a flowchart of a receiver signal-processing method 700 that can be employed by processor 470 (FIG. 4) or 570 (FIG. 5) to recover data stream 102 from digital signals $468_1$-$468_L$ or $568_1$-$568_J$ according to another embodiment of the invention where optical variants, including phase-conjugated optical variants and pre-dispersion-compensated phase-conjugated vector optical variants, are carried by wavelength channels or by different spatial paths.

Steps 701-704 are similar to steps 301-304, but process E-fields received by at least two front ends for at least two vector signal variants. For the transmitter embodiment described by method 600, step 705 may be configured to obtain the original interleaved optical signal intended for transmission as follows $$E_{even}(t) = E_{1x}(t) + E_{2x}(t)^*,$$

$$E_{odd}(t) = E_{1y}(t) + E_{2y}(t)^*, \qquad (24)$$

where $E_{1x}(t)$ and $E_{1y}(t)$ are the recovered E-fields for front end $172_1$, and $E_{2x}(t)$ and $E_{2y}(t)$ are the recovered E-fields for front end $172_2$.

At step 706, the recovered original optical signal field, E(t), is obtained by interleaving the recovered even and odd ports of the original signal field, $E_{even}(t)$ and $E_{odd}(t)$, from step 705.

At step 707, the recovered original optical signal field, E(t), is renormalized, demodulated, and FEC decoded to obtain payload data 102.

While this invention has been described with reference to illustrative embodiments, this description is not intended to be construed in a limiting sense.

Although phase-conjugated optical variants have been defined in the time domain, phase conjugation can also be realized in the frequency domain. As an example, two OFDM symbols can be phase-conjugated optical variants when the modulated subcarriers of the second OFDM symbol are complex conjugates of those of the first OFDM symbol. In effect, frequency-domain phase conjugation can be seen as time-domain phase conjugation plus time reversal.

Although system 500 (FIG. 5) has been described in reference to multi-core fiber 540, it can be adapted for use with a set of parallel single-mode fibers, or with a multi-mode fiber, wherein different guided modes of the multi-mode fiber provide the spatial degrees of freedom for the generation and transmission of optical variants. Representative optical couplers that can be used in conjunction with the multi-mode fiber in such a system are disclosed, e.g., in U.S. Patent Application Publication Nos. 2010/0329670 and 2010/0329671 and U.S. patent application Ser. No. 12/986,468, filed on Jan. 7, 2011, and Ser. No. 12/827,284, filed on Jun. 30, 2010, all of which are incorporated herein by reference in their entirety.

In one embodiment, different cores of multi-core fiber 540 can be configured to concurrently transmit optical variants corresponding to different data, for example bit-words. In one embodiment, transmitter 510 is configured so that different cores of multi-core fiber 540 concurrently transmit optical variants corresponding to different bit-words. In another embodiment, transmitter 510 is configured with multi-core fiber 540 so that, at any time, at least two cores of the multi-core fiber transmit optical variants corresponding to the same bit-word.

Furthermore, system 500 can be modified in a relatively straightforward manner to use optical variants that differ from each other in one or more of time, polarization, carrier wavelength, and space. Transmitting phase-conjugated optical variants through different spatial paths may be exploited to enhance the security of communication, e.g., by allowing for reliable communication only when at least two optical variants are simultaneously detected and coherently superimposed (to cancel out the nonlinear distortions caused on them).

Moreover, transmitting phase-conjugated optical variants may be naturally compatible with the use of low-noise phase-sensitive amplifiers based on the interaction between a signal and its phase-conjugated duplicate in parametric optical amplification, to improve communication immunity to both nonlinear distortions and the linear optical noise.

In various alternative embodiments of methods 200, 300, 600, and 700, the order of certain processing steps may be changed to differ from the order indicated in FIGS. 2, 3, 6, and 7, respectively.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flowcharts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical transmitter, the optical transmitter comprising:
    a processor configured to generate electronic representations of at least two pre-dispersion-compensated phase-conjugated optical variants carrying a same modulated payload data for transmission; and
    at least one optical modulator for modulating the electronic representations, wherein an amount of dispersion induced on the pre-dispersion-compensated phase-conjugated optical variants depends on an accumulated dispersion (AD) of a transmission link through which the pre-dispersion-compensated phase-conjugated optical variants are to be transmitted.

2. The apparatus of claim 1 wherein the processor is configured to generate the electronic representations by convolving an E-field representation with a pre-dispersion-compensation function.

3. The apparatus of claim 1 wherein the amount of dispersion induced on the pre-dispersion-compensated phase-conjugated optical variants is about $-AD/2$, where AD is the accumulated dispersion of the transmission link through which the pre-dispersion-compensated phase-conjugated optical variants are to be transmitted.

4. The apparatus of claim 1 wherein the amount of dispersion induced on the pre-dispersion-compensated phase-conjugated optical variants depends on a power-weighted accumulated dispersion of the transmission link through which the pre-dispersion-compensated phase-conjugated optical variants are to be transmitted.

5. The apparatus of claim 1 wherein the processor is configured to induce dispersion by electronically pre-compensating complex fields representing phase-conjugated optical variants.

6. The apparatus of claim 1 wherein the processor is configured to electronically pre-compensate the complex fields representing the phase-conjugated optical variants using the overlap-and-add method.

7. The apparatus of claim 1 wherein the at least two pre-dispersion-compensated phase-conjugated optical variants, upon exiting the transmitter, differ from one another in one or more of polarization, time of transmission, spatial localization, optical carrier wavelength, and subcarrier frequency.

8. The apparatus of claim 1 wherein the digital representations of the at least two pre-dispersion-compensated phase-conjugated optical variants are complex conjugates before being pre-dispersion compensated.

9. The apparatus of claim 1 wherein one digital representation of the at least two pre-dispersion-compensated phase-conjugated optical variants includes a complex conjugate version of the payload data for transmission with a constant phase rotation before being pre-dispersion compensated.

10. The apparatus of claim 1 wherein the transmitter comprises two optical modulators configured to generate two orthogonally-polarized pre-dispersion-compensated phase-conjugated optical variants at a same wavelength.

11. The apparatus of claim 1 wherein the same modulated payload data for transmission uses a modulation scheme selected from the group consisting of amplitude-shift keyed (ASK), phase-shift keyed (PSK), quadrature-amplitude modulated (QAM), or polarization-division-multiplexed (PDM) signals, or a combination thereof.

12. The apparatus of claim 1 further comprising:
    a transmission link, wherein the transmission link further includes an optical pre-dispersion compensation module, an optical in-line dispersion compensation module, an optical post-dispersion compensation module, or a combination thereof.

13. The apparatus of claim 1 further comprising:
    a transmission link, wherein the transmission link is one or more of single-mode fiber, fiber bundle, multi-core-fiber, and multi-mode fiber.

14. The apparatus of claim 1 further comprising:
    a transmission link, wherein the transmission link comprises an optically amplified transmission fiber span.

15. The apparatus of claim 1 further comprising:
    an optical receiver for receiving versions of at least two pre-dispersion-compensated phase-conjugated optical variants.

16. The apparatus of claim 15 wherein the optical receiver comprises:
    a front-end circuit configured to convert the received versions of at least two pre-dispersion-compensated phase-conjugated optical variants carrying same modulated payload data into a corresponding plurality of digital electrical signals; and
    a processor configured to:
        process the plurality of digital electrical signals to generate a set of complex values representing the same modulated payload data;
        sum the complex values of the set to generate a summed complex value;
        map the summed complex value onto a constellation; and determine based on the mapped summed complex value a data represented by the same modulated payload data.

17. The apparatus of claim 16 wherein the processor configured to process the plurality of digital electrical signals to generate a set of complex values representing the same modulated payload data is further configured to
perform post-dispersion compensation on the received versions of at least two pre-dispersion-compensated phase-conjugated optical variants; and
remove phase conjugation between the received versions of the at least two pre-dispersion-compensated phase-conjugated optical variants.

18. The apparatus of claim 16 wherein the optical receiver comprises at least one polarization-diversity optical hybrid, one optical local oscillator, and four analog-to-digital convertors (ADCs).

19. The apparatus of claim 16 wherein the processor configured to generate a set of complex values representing the same modulated payload symbol is further configured to
compensate for residual dispersion of the received versions of at least two pre-dispersion-compensated phase-conjugated optical variants.

20. The apparatus of claim 16, wherein the processor configured to process the plurality of digital electrical signals to generate the set of complex values representing the same modulated payload symbol is configured to
perform one or more of time synchronization, channel estimation, channel compensation, frequency estimation, frequency compensation, phase estimation, and phase compensation.

21. The apparatus of claim 1 further comprising
a transmission link; and
at least one phase-sensitive optical amplifier for amplifying at least two pre-dispersion-compensated phase-conjugated optical variants in the transmission link.

22. The apparatus of claim 21 wherein the phase-sensitive optical amplifier is an optical parametric amplifier.

23. The apparatus of claim 1 wherein transmitter is configured to transmitted the pre-dispersion-compensated phase-conjugated optical variants on different paths for a same receiver and with a signal quality such that the payload data cannot be decoded with detection of a single pre-dispersion compensated phase-conjugated optical variant, the method thereby providing security of communication between the transmitter and a receiver.

24. A method comprising:
generating, by a processor, digital representations of at least two pre-dispersion-compensated phase-conjugated optical variants carrying a same modulated payload data for transmission; and
modulating, by at least one optical modulator, the digital representations, wherein an amount of dispersion induced on the pre-dispersion compensated phase-conjugated optical variants depends on an accumulated dispersion (AD) of a transmission link through which the pre-dispersion compensated phase-conjugated optical variants are to be transmitted.

25. The method of claim 24 wherein generating the digital representations comprises:
convolving an E-field representation with a pre-dispersion-compensation function.

26. The method of claim 24 wherein the amount of dispersion induced on the pre-dispersion-compensated phase-conjugated optical variants is about −AD/2, where AD is the accumulated dispersion of the transmission link through which the phase-conjugated optical variants are to be transmitted.

27. The method of claim 24 wherein the amount of dispersion induced on the pre-dispersion-compensated phase-conjugated optical variants depends on a power-weighted accumulated dispersion of the transmission link through which the phase-conjugated optical variants are to be transmitted.

28. The method of claim 24 wherein generating the digital representations comprises:
inducing dispersion by electronically pre-compensating complex fields representing phase-conjugated optical variants.

29. The method of claim 24 wherein the pre-dispersion-compensated phase-conjugated optical variants are transmitted through different paths for a same receiver and with a signal quality such that the payload data cannot be decoded with detection of a single pre-dispersion compensated phase-conjugated optical variant, the method thereby providing security of communication between the transmitter and a receiver.

30. The method of claim 24 further comprising:
converting, at an optical receiver, received versions of at least two pre-dispersion-compensated phase-conjugated optical variants carrying same modulated payload data into a corresponding plurality of digital electrical signals;
processing the plurality of digital electrical signals to generate a set of complex values representing the same modulated payload data;
summing the complex values of the set to generate a summed complex value;
mapping the summed complex value onto a constellation; and
determining based on the mapped summed complex value a data represented by the same modulated payload data.

31. An apparatus comprising an optical transmitter, the optical transmitter comprising:
a processor configured to generate electronic representations of at least two phase-conjugated optical variants carrying a same modulated payload data for transmission;
at least one optical modulator for modulating the electronic representations; and
an optical dispersion compensator configured to provide pre-dispersion compensation of the modulated electronic representations, wherein the amount of dispersion compensated depends on an accumulated dispersion (AD) of a transmission link through which the modulated electronic representations are to be transmitted.

* * * * *